UNITED STATES PATENT OFFICE.

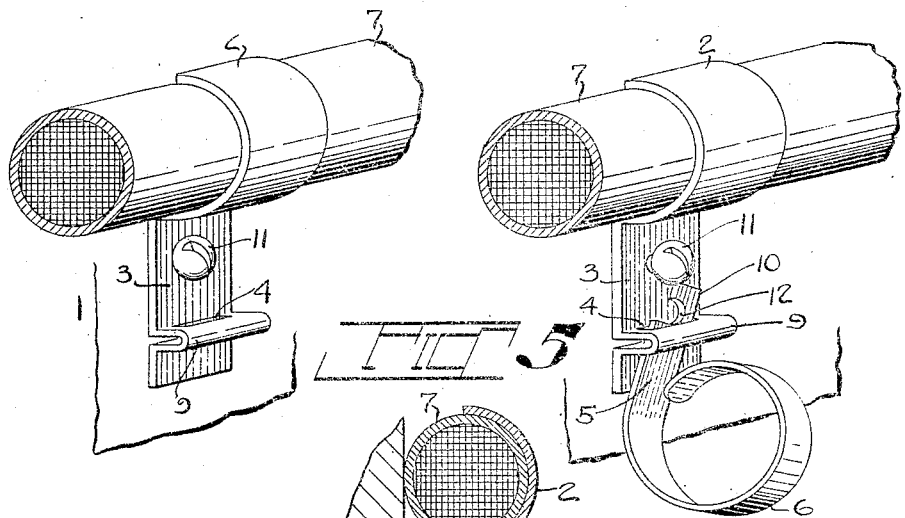
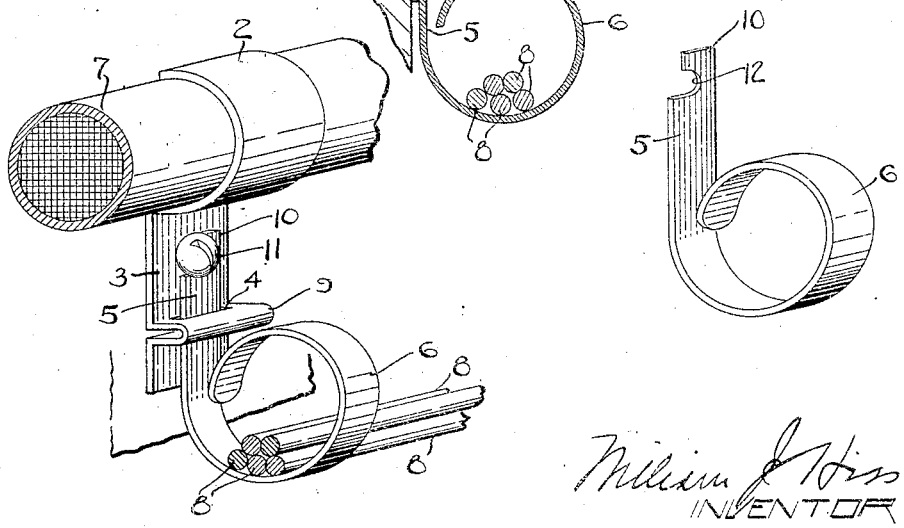

WILLIAM J. HISS, OF NEW YORK, N. Y., ASSIGNOR TO DIAMOND EXPANSION BOLT COMPANY, OF NEW YORK, N. Y., A CORPORATION OF NEW YORK.

CONDUIT OR CABLE CLAMP AND BRIDLE-RING.

1,365,613. Specification of Letters Patent. Patented Jan. 11, 1921.

Application filed January 12, 1920. Serial No. 351,041.

*To all whom it may concern:*

Be it known that I, WILLIAM J. HISS, a citizen of the United States, residing in the borough of Manhattan, city, county, and State of New York, have invented certain new and useful Improvements in Conduit or Cable Clamps and Bridle-Rings, of which the following is a specification, taken in connection with the accompanying drawings.

My invention relates to the combination of a conduit or cable clamp and bridle ring, and also to a cable or conduit clamp and a bridle ring as sub-combinations of the main combination, and as articles of manufacture.

My invention further relates to a cable or conduit clamp, which can be manufactured at minimum expense and to which a bridle ring may be secured either at the original installation of the cable and conduit clamp, or at any future time when it may be desirable to support one or more runs of bridle wires.

My invention further relates to a conduit or cable clamp provided with a slot to receive a flat shank of a bridle ring. My invention further relates to the combination of such conduit or cable clamp with a bridle ring having a flat shank to fit into the slot in the cable clamp, and provided with means to coöperate with the screw which secures the conduit or cable clamp to the support.

My invention further relates to a conduit or cable clamp which is preferably formed out of pressed sheet material as pressed steel, or which may be formed from castings of malleable iron, brass, an alloy, aluminum or any other metal, or may be made out of pressed fibrous material.

My invention further relates to certain combinations, sub-combinations, articles of manufacture, and details of construction, all of which will be more fully hereinafter described and pointed out in the claims.

In the figures, in which I have shown one embodiment of my invention, the same reference numerals refer to similar parts in the several figures.

Figure 1 is a perspective view of my conduit and cable clamp and of a cable which it supports;

Fig. 2 is a perspective view of the conduit or cable clamp and the bridle ring in the first position of assembling these two parts;

Fig. 3 is a perspective view similar to Fig. 2, but showing the bridle ring secured to the conduit or cable clamp;

Fig. 4 is a perspective view of the bridle ring;

Fig. 5 is a vertical section through the cable or conduit clamp and the bridle ring shown in Fig. 3.

In the commercial use of conduit or cable clamps it is not generally possible, at the date of the original installation, to determine whether or not bridle rings will be needed to support additional loose strands of bridle wires. In commercial practice, a cable is supported on a wall or other suitable support and it may be weeks, months, or years later that the telephone engineers will determine that it is desirable to support bridle wires parallel to the cable.

By my invention my original conduit and cable clamp may be used as a separate article of manufacture or sub-combination, and then later, when the needs of the service demands it, my bridle ring may be supported by the same conduit or cable clamp, when the complete combination would be used.

In my invention I form my cable or conduit clamp 1 with a hook portion 2 and a base 3. I provide the base with a slot 4 to coöperate with the shank 5 of the bridle ring 6, should the telephone or telegraph engineers at the time of installing the cable, or any later date, determine to supplement the service by adding one or more bridle wires 8.

Preferably, though not necessarily, the conduit or cable clamp 1 is formed out of sheet metal, though it may be formed out of other material as previously explained. When formed out of sheet metal the base 3 is bent back on itself to form the bend or hump 9 which is provided with the elongated slot 4. This bend or hump 9 also serves to strengthen the base 3.

The conduit or cable clamp 1 may be used alone to support the cable 7 as shown in Fig. 1. Immediately, or years thereafter, the bridle ring 6 can be combined with the cable clamp by inserting the flat shank 5 through the slot 4, as shown in Fig. 2, letting the end 10 come under the screw 11 and into the socket 12 in said end 10, see Fig. 3. All that is necessary is to loosen the screw 11, (but not remove it) to position the end 10 when the screw 11 can be immediately tightened when it will do the double duty of holding the conduit or cable clamp and also the bridle ring 6.

Should at any future time it be desirable to remove the bridle wires 8, 8 and the bridle ring 6, this can easily be done without the danger of the cable 7 falling by loosening one screw 11 at a time, withdrawing the bridle ring 6, through the slot 4, and then again tightening up the screw 11.

It will be noted that in my improved construction no tapping or screw threading of the base 3 is required and that it is not necessary or desirable to place screw threads on the bridle ring 6, all of which saves expense of manufacture.

Having thus described this invention in connection with an illustrative embodiment thereof, to the details of which I do not desire to be limited, what is claimed as new and what is desired to secure by Letters Patent is set forth in the appended claims.

What I claim is:—

1. A conduit or cable clamp provided with a hook portion and a base; the base being provided with means to assist in supporting a bridle ring, said means having a slot in a plane parallel with the longitudinal axis of the base, the base being also provided with a hole to receive a screw.

2. A conduit or cable clamp provided with a hook portion and a base, the base being provided with means to assist in supporting a bridle ring, said means having a slot in a plane parallel with the longitudinal axis of the base, said slot being closely adjacent to one surface of the base, the base being also provided with a hole to receive a screw.

3. A conduit or cable clamp provided with a hook portion and a base, a portion of the base being raised above the plane of the rest of the base, and provided with a slot on either side of the raised portion.

4. A conduit or cable clamp formed from pressed sheet material provided with a hook portion and a base, a portion of the base being bent back on itself to form a hump, the hump being provided with alined slots to receive the shank of a bridle ring on the outer surface of the base.

5. The combination of a conduit or cable clamp provided with a hook portion and a base, the base being provided with means to assist in supporting a bridle ring, said means having a slot in a plane parallel with the longitudinal axis of the base, the base being also provided with a hole to receive a screw and a bridle ring having a shank coöperating with the slot.

6. The combination of a conduit or cable clamp provided with a hook portion and a base, the base being provided with means to assist in supporting a bridle ring, said means having a slot in a plane parallel with the base, and a bridle ring having a shank coöperating with the slot and lying on the outer surface of the base.

7. The combination of a conduit or cable clamp provided with a hook portion and a base, the base being provided with means to assist in supporting a bridle ring, said means having a slot above the outer or exposed surface of the base to receive the shank of a bridle ring, and a bridle ring having a shank extending through the slot and lying on the outer surface of the base.

8. The combination of a conduit or cable clamp provided with a hook portion and a base, the base being provided with means to assist in securing a bridle ring, said means having a slot above the outer or exposed surface of the base to receive the shank of a bridle ring, and a bridle ring having a shank extending through the slot and lying on the outer surface of the base, the shank being provided with means to coöperate with the securing screw of the clamp.

9. A conduit or cable clamp formed from pressed sheet material provided with a hook portion and a base, a portion of the base being bent back on itself to form a hump, the hump being provided with alined slots to receive the shank of a bridle ring on the outer surface of the base, and a bridle ring having a shank to pass through said alined slots and lie on the outer surface of the base.

10. A conduit or cable clamp formed from pressed sheet material provided with a hook portion and a base, a portion of the base being bent back on itself to form a hump, the hump being provided with alined slots to receive the shank of a bridle ring on the outer surface of the base, and a bridle ring having a shank to pass through said alined slots and lie on the outer surface of the base, the shank being provided with means to coöperate with a securing screw for the clamp.

11. The combination in a conduit or cable clamp provided with a hook portion and a base, a screw to secure the base to a support, means on the base to assist in securing a bridle ring to the clamp, and a bridle ring having a shank coöperating with the means on the base and with the screw.

12. The combination in a conduit or cable clamp provided with a hook portion and a base, a screw to secure the base to a support, means on the base to assist in securing a bridle ring to the clamp, and a bridle ring having a shank coöperating with the means on the base, the end of the shank being provided with a hook to engage with the securing screw.

13. The combination in a conduit or cable clamp formed of pressed material, having a hook portion, a base, said base having a portion bent back on itself to form a hump and provided with a slot to receive a bridle ring, a screw to secure the base to a support, and a bridle ring having a shank to coöperate with the slot in the base and also with the screw.

WILLIAM J. HISS.

Witnesses:
 AMMIÉ E. CAMERON,
 MILDRED C. WILTSEY.